United States Patent

Speilman et al.

(10) Patent No.: US 9,737,951 B2
(45) Date of Patent: Aug. 22, 2017

(54) WELDING WIRE FEEDER WITH MULTIMOTOR STANDARD

(75) Inventors: Brandon John Speilman, Kaukauna, WI (US); Peter Donald Mehn, Oshkosh, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1699 days.

(21) Appl. No.: 13/005,393

(22) Filed: Jan. 12, 2011

(65) Prior Publication Data

US 2011/0220630 A1 Sep. 15, 2011

Related U.S. Application Data

(60) Provisional application No. 61/312,387, filed on Mar. 10, 2010.

(51) Int. Cl.
B23K 9/133 (2006.01)

(52) U.S. Cl.
CPC .................. *B23K 9/1336* (2013.01)

(58) Field of Classification Search
CPC .................................................. B23K 9/1336
USPC ............................ 219/137.31, 137.7, 137.71
See application file for complete search history.

(56) References Cited

U.S. PATENT DOCUMENTS

| | | | | |
|---|---|---|---|---|
| 4,937,417 A | * | 6/1990 | Fox ............................... | 219/76.1 |
| 4,954,690 A | * | 9/1990 | Kensrue .................... | 219/137.31 |
| 5,260,545 A | * | 11/1993 | West et al. ................. | 219/130.1 |
| 5,932,123 A | * | 8/1999 | Marhofer et al. ........ | 219/130.01 |
| 6,248,975 B1 | * | 6/2001 | Lanouette et al. ....... | 219/130.21 |
| 6,262,391 B1 | * | 7/2001 | Nowak et al. ........... | 219/137.71 |
| 6,479,795 B1 | * | 11/2002 | Albrecht et al. ........... | 219/137.2 |
| 7,244,909 B2 | * | 7/2007 | Kensrue et al. .......... | 219/137.31 |
| 7,465,902 B2 | * | 12/2008 | Christopher et al. ...... | 219/137.7 |
| 2005/0205543 A1 | * | 9/2005 | Meckler .................... | 219/137.71 |
| 2007/0119840 A1 | * | 5/2007 | Flattinger et al. ........ | 219/137.31 |
| 2009/0032514 A1 | * | 2/2009 | Christopher et al. .... | 219/137.31 |
| 2009/0267037 A1 | * | 10/2009 | Johnson .................... | H02G 1/02 254/134.3 PA |
| 2011/0204034 A1 | * | 8/2011 | Schartner et al. ....... | 219/137 PS |
| 2011/0309063 A1 | * | 12/2011 | Ott et al. .................. | 219/137.71 |

FOREIGN PATENT DOCUMENTS

| | | |
|---|---|---|
| CN | 1913999 | 2/2007 |
| CN | 101051808 | 10/2007 |
| CN | 101214577 | 7/2008 |
| WO | 2005075138 A2 | 8/2005 |

OTHER PUBLICATIONS

International Search Report for application No. PCT/US2011/027364 mailed May 31, 2011.

* cited by examiner

*Primary Examiner* — David Angwin
*Assistant Examiner* — Frederick Calvetti
(74) *Attorney, Agent, or Firm* — Fletcher Yoder P.C.

(57) ABSTRACT

A welding wire feeder having a multiple motor drive standard is provided. The welding wire feeder may be coupled to one of a plurality of electric motor assemblies, and a user may select the electric motor assembly to be used from a menu of electric motor assemblies on a user interface or may enter customized configuration parameters for the electric motor assembly on the user interface. The control circuitry of the welding wire feeder may then be properly configured backed upon which electric motor assembly is selected or based upon the customized configuration parameters entered.

17 Claims, 3 Drawing Sheets

WELDING WIRE FEEDER WITH MULTIMOTOR STANDARD

CROSS REFERENCE TO RELATED APPLICATIONS

This application is a Non-Provisional Patent Application of U.S. Provisional Patent Application No. 61/312,387 entitled "Drive Motor Configuration Means", filed Mar. 10, 2010, which is herein incorporated by reference.

BACKGROUND

The invention relates generally to welding systems, and, more particularly, to a welding wire feeder with a multiple drive motor standard.

Welding is a process that has become increasingly ubiquitous in various industries and applications. Such welding operations rely on a variety of types of equipment to ensure the supply of welding consumables (e.g., wire feed, shielding gas, etc) is provided to the weld in an appropriate amount at the desired time. For example, metal inert gas (MIG) welding typically relies on a wire feeder to ensure the appropriate advance of welding wire to a welding torch, with the wire establishing the welding arc and being consumed as welding progresses.

In MIG systems, the wire feeding needs for a given welding application may vary depending on a variety of factors such as the type of wire used, the size of the wire spool, the physical characteristics of the wire, the length and type of torch and torch cable, the temperature of the welding process, the type of welding process, and so forth. Consequently, a variety of drive motors may be employed to meet various wire feed needs. For example, wire feeders may be purchased with a high speed, low speed, standard speed, or high torque motor for different wire feed needs. Unfortunately, end users cannot always identify these wire feed needs initially or may change between significantly different welding tasks, and sometimes need to change the wire feed characteristics using a different drive motor for a specific application. While end users may have the option to use an upgrade or conversion kit to change the drive motor of a wire feeder in the field, the use of an upgrade or conversion kit may be costly and problematic. More specifically, wire feeders typically require different circuit board assemblies with different software for different motors to operate properly.

BRIEF DESCRIPTION

In an exemplary embodiment, a welding wire feeder system includes a wire drive configured to contact a welding wire and to drive the welding wire towards a welding application. The welding wire feeder system also includes an electric motor assembly coupled to the wire drive and configured to force rotation of the wire drive during operation where the electric motor assembly is selected from a plurality of electric motor assemblies useable on the wire feeder. The welding wire feeder system further includes drive circuitry coupled to the electric motor assembly that is configured to apply drive signals to the electric motor assembly in operation, and control circuitry coupled to the drive circuitry and configured to apply control signals to the drive circuitry based upon which electric motor assembly is selected. The control circuitry is field configurable to drive each of the plurality of electric motor assemblies based upon configuration parameters stored in the control circuitry.

In another exemplary embodiment, a welding wire feeder system includes a wire drive configured to contact a welding wire and to drive the welding wire towards a welding application and a plurality of electric motor assemblies, each electric motor assembly configured to be coupled to the wire drive and to force rotation of the wire drive during operation. The welding wire feeder system further includes drive circuitry configured to be coupled to any one of the electric motor assemblies and configured to apply drive signals to a selected one of the electric motor assemblies in operation. The welding wire feeder system also includes control circuitry coupled to the drive circuitry where the control circuitry is configured to apply control signals to the drive circuitry based upon which electric motor assembly is selected. The control circuitry is field configurable to drive each of the plurality of electric motor assemblies based upon configuration parameters stored in the control circuitry.

In a further embodiment, a method for configuring a welding wire feeder system includes coupling an electric motor assembly to a wire drive configured to contact a welding wire and to drive the welding wire towards a welding application where the electric motor assembly is selected from a plurality of electric motor assemblies. The method further includes coupling drive circuitry to the electric motor assembly where the drive circuitry is configured to apply drive signals to a selected one of the electric motor assemblies in operation. The method also includes coupling control circuitry to the drive circuitry where the control circuitry is configured to apply control signals to the drive circuitry during operation. Further, the method includes configuring the control circuitry based upon which electric motor assembly is selected. The control circuitry is field configurable to drive each of the plurality of electric motor assemblies based upon configuration parameters stored in the control circuitry.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, embodiments of a welding wire feeder configured to operate with one of a variety of electric motor assemblies are described. The welding wire feeder is adapted to receive and control one of a variety of electric motor assemblies using configuration parameters stored in control circuitry of the welding wire feeder. That is, a user may select an electric motor assembly from a variety of electric motor assemblies, couple the electric motor assembly to the welding wire feeder, and the welding wire feeder may control the electric motor assembly using configuration parameters for that electric motor assembly that are stored in the control circuitry of the welding wire feeder.

Accordingly, the user may configure the welding wire feeder to drive each of a variety of electric motor assemblies while in the field. In particular, in a presently contemplated embodiment, the user may configure the welding wire feeder by selecting the electric motor assembly to be used from a menu of electric motor assemblies displayed on a user interface coupled to the welding wire feeder. Furthermore, in certain embodiments, the user interface may provide customizable parameters where the user may configure one or more individual parameters for a particular electric motor assembly. The foregoing features may have the effect of increasing the ease of drive motor implementation for a welding wire feeder for the field and the factory.

Figure 1:
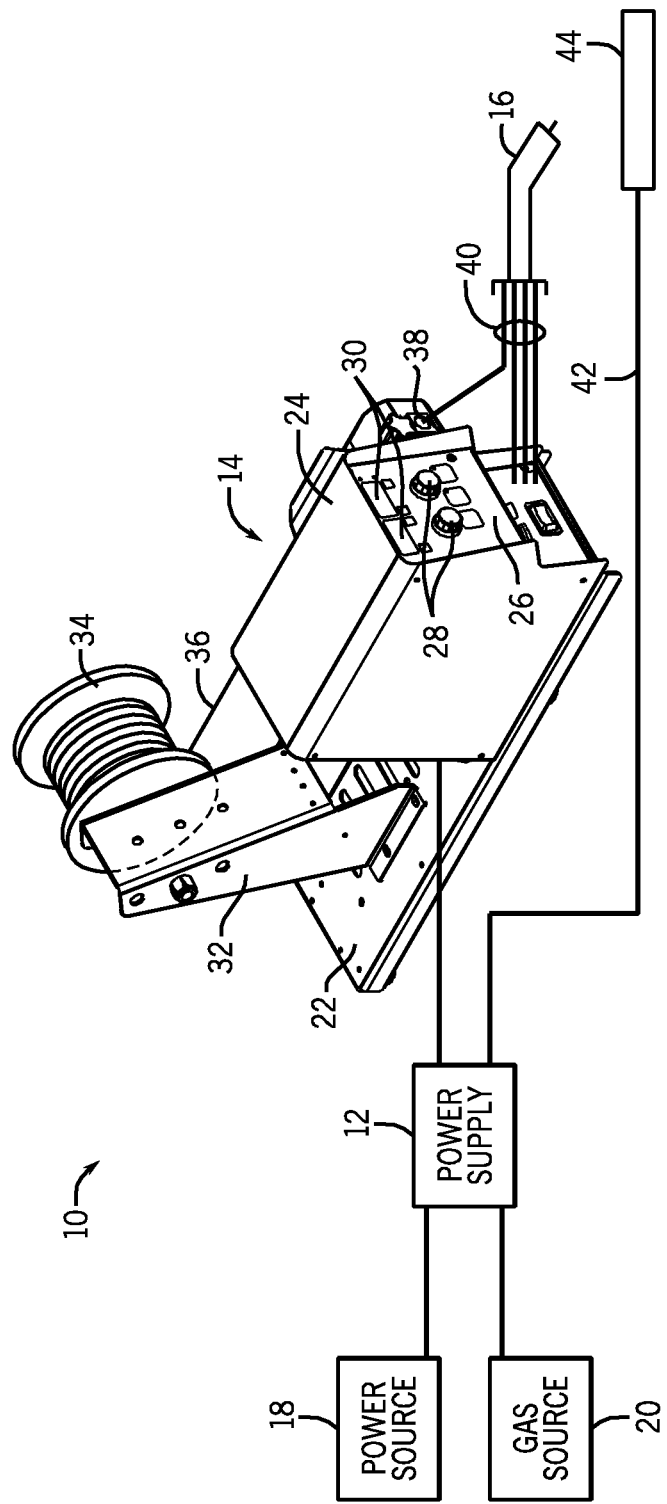
FIG. 1 is a schematic of an exemplary welding system including a perspective view of a welding wire feeder in accordance with aspects of the present invention.

Turning now to the drawings, FIG. 1 illustrates an exemplary welding system 10 which powers, controls, and provides supplies to a welding operation. The welding system 10 includes a welding power supply 12, a wire feeder 14, and a welding gun 16. The power supply 12 may be a power converter style welding power supply or an inverter welding power supply requiring a power source 18. In other embodiments, the welding power supply 12 may be a generator or alternator welding power supply which may include an internal combustion engine. The welding power supply 12 may also include a control panel (not shown) for adjusting various welding parameters such as voltage and current, and for connecting a power source 18, if required. Additionally, a gas source 20 may be coupled to the welding power supply 12. The gas source 20 is the source of the gas that is supplied to the welding gun 16. As shown, the welding power supply 12 is coupled to the welding wire feeder 14. As will be appreciated, the welding power supply 12 may be couple to the welding wire feeder 14 by a feeder power lead, a weld cable, a gas hose, and a control cable.

The welding wire feeder 14 shown in the illustrated embodiment provides welding wire to the welding gun 16 for use in the welding operation. As shown, the welding wire feeder 14 may include a base 22 and a housing 24. The housing 24 may enclose a variety of internal components such as a wire feed drive system, an electric motor assembly, an electric motor, and so forth. The welding wire feeder 14 may further include a control panel 26 that allows the user to set one or more wire feed parameters, such as wire feed speed. In the illustrated embodiment, the control panel includes knobs 28 which may be used to set or adjust wire feed parameters. The control panel 26 further includes displays 30 which may provide system feedback to the user. As discussed in further detail below, the control panel 26 may include a user interface that may display a menu of electric motor assemblies from which the user may select an electric motor assembly to be used for the welding operation.

The welding wire feeder 14 further includes a welding wire spool support 32 on which a welding wire spool 34 may be disposed. As shown in the illustrated embodiment, a welding wire 36 may be fed into the welding wire feeder 14 from the welding wire spool 34. A variety of welding wires 36 may be used. For example, the welding wire 36 may be solid carbon steel, solid aluminum, solid stainless steel, composite and flux cored wire, and so forth. Furthermore, the thickness of the welding wire 36 may vary depending on the welding application for which the welding wire 36 is used. For example, the welding wire 36 may be 22 gauge, 20 gauge, 18 gauge, 16 gauge, etc. Furthermore, the welding wire feeder 14 may be used with any wire feeding process, such as gas operations (gas metal arc welding (GMAW)) or gasless operations (shielded metal arc welding (SMAW)). Additionally, as will be appreciated, different drive motors may be required depending on the type and size of welding wire 36 and/or the wire feeding process. It should be noted that the physical configuration of the wire feeder may vary considerably, and the particular wire feeder shown is intended for illustrative purposes only. In certain cases, the wire feeder may include more than one wire spool, may be fixed or secured to other welding system components, or may be entirely portable.

As shown, the welding wire 36 exits the welding wire feeder 14 through a welding wire outlet 38. The welding wire is fed to the welding gun 16 through a first cable 40. The first cable 40 may also supply gas to the welding gun 16. As further shown, a second cable 42 couples the welding power supply 12 to a work piece 44 (typically via a clamp) to complete the circuit between the welding power supply 12 and the welding gun 16 during a welding operation.

It should be noted that modifications to the exemplary welding system 10 of FIG. 1 may be made in accordance with aspects of the present invention. For example, the welding wire spool support 32 may be configured to support more than one welding wire spool 24, and the control panel 26 of the welding wire feeder 14 may include other buttons, dials, etc for adjusting various wire feed settings. Furthermore, although the illustrated embodiments are described in the context of a MIG welding process, the features of the invention may be utilized with a variety of other suitable welding systems and processes.

Figure 2:
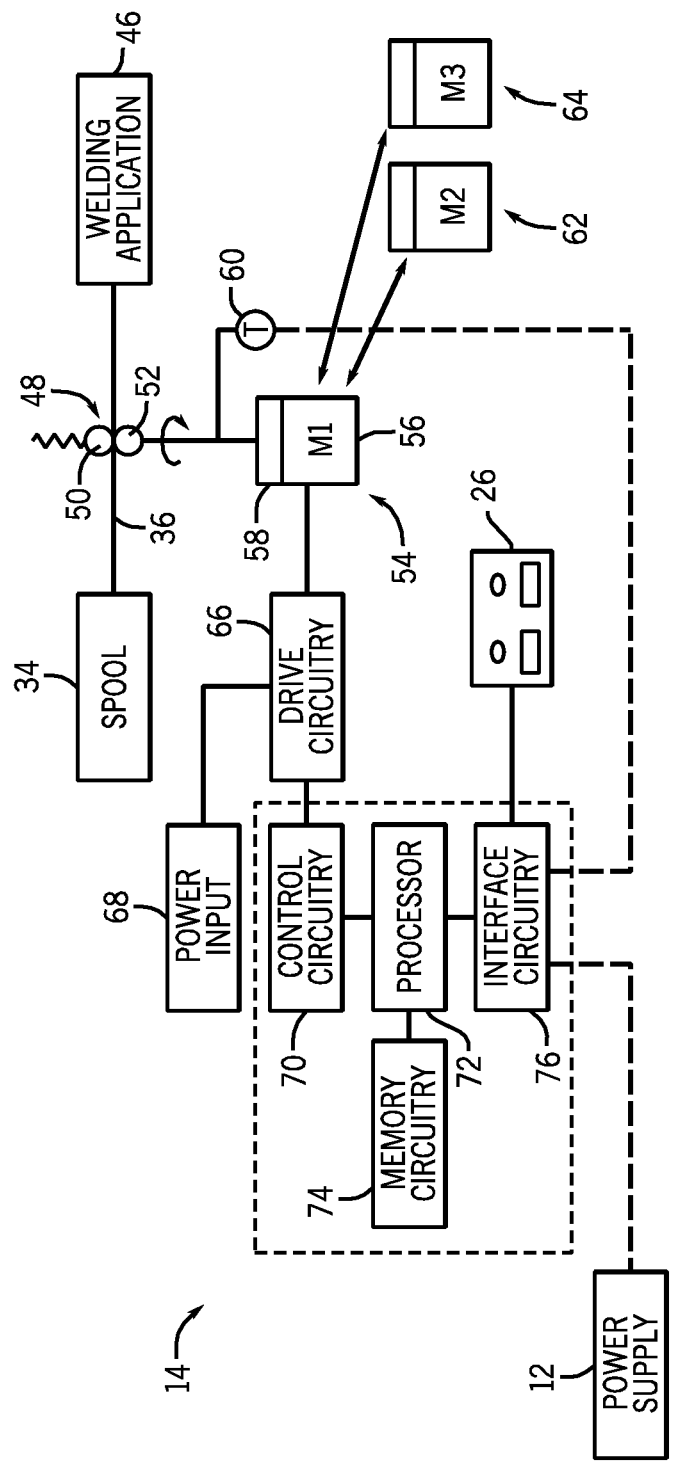
FIG. 2 is a block diagram illustrating exemplary functional components of the welding wire feeder system of FIG. 1 in accordance with aspects of the present invention.

FIG. 2 is a block diagram illustrating certain of the internal components of the welding wire feeder 14. As discussed above, a welding wire 36 may be fed to the welding wire feeder 14 from a welding wire spool 36. The welding wire feeder 14 may then feed the welding wire 36 to a welding application 46 (MIG, GMAW, SMAW, etc). More specifically, the welding wire 36 may be driven towards the welding application 46 by a wire drive 48 within the welding wire feeder 14. In the illustrated embodiment, the wire drive 48 includes a first roller 50 and a second roller 52. As shown, the first roller 50 is biased towards the welding wire 36, and the second roller 52 is mechanically coupled to an electric motor assembly 54 having an electric motor 56. As will be appreciated, the second roller 52 is rotated by the electric motor assembly 54 to drive the welding wire 36 from the welding wire feeder 14, while the first roller 50 is biased towards the welding wire 36 to maintain good contact between the first roller 50, the second roller 52 and the welding wire 36. In other embodiments, the wire drive 48 may include multiple rollers of this type.

As mentioned above, the welding wire feeder 14 includes the electric motor assembly 54 which may be one of a plurality of electric motor assemblies. In addition to the electric motor 56, the electric motor assembly 54 may include a gear reducer 58. The gear reducer 58 may provide additional speed control of the electric motor 56. Furthermore, in certain embodiments, the electric motor assembly 54 may include a speed sensor 60. For example, the speed sensor 60 may be a tachometer, tachogenerator, or quadrature encoder. The speed sensor 60 may measure and provide the user with the rotational speed of the electric motor 56, and may be used for closed-loop control of the wire drive speed. As discussed above, different electric motor assemblies may be required for different wire feeding needs. For example, different wire feeding applications may require high speed, low speed, or high torque electric motor assemblies. As discussed in further detail below, in embodiments of the present invention, one of a plurality of electric motor assemblies may be used with the welding wire feeder 14, and the welding wire feeder 14 may be configured by a user in the field to drive each of the electric motor assemblies. In other words, the electric motor assembly 54 shown in the illustrated embodiment may be exchanged for a second electric motor assembly 62 or a third electric motor assembly 64 and the welding wire feeder 14 may be configured to drive the selected electric motor assembly.

The welding wire feeder 14 includes drive circuitry 66 coupled to the electric motor assembly 54. In one embodiment, the drive circuitry 66 may be coupled to the electric motor assembly 54 by two leads (not shown). Other embodiments may include additional leads for connecting the electric motor assembly 54 to the drive circuitry 66. For example, an additional lead may be required for attaching the drive circuitry 66 to an electric motor assembly 54 having a speed sensor 60. The drive circuitry 66 may be configured to apply drive signals to the electric motor assembly 54 in operation. The drive circuitry 66 may further include a power input 68 to provide power to the drive circuitry 66. The drive circuitry may further be electrically coupled to control circuitry 70. As will be appreciated, the control circuitry 70 may be configured to apply control signals to the drive circuitry 66. For example, the control circuitry 70 may provide pulse width modulated (PWM) signals to the drive circuitry 66 to regulate a duty cycle of drive signals from the drive circuitry 66 to the electric motor assembly 54. For example, the control circuitry 70 may send PWM signals to the drive circuitry 66 to achieve a duty cycle of 100%, 50%, 25%, and so forth for the drive signals applied to the electric motor assembly 54.

As shown in the illustrated embodiment, the control circuitry 70 may include a processor 72, memory circuitry 74 and interface circuitry 76. The interface circuitry 76 may be further coupled to the control panel 26 of the welding wire feeder 14. The control panel 26 may include a user interface configured to display a menu of electric motor assemblies from which a user may select an electric motor assembly to be used with the welding wire feeder 14. As mentioned above, different electric motor assemblies may be required for different wire feeding needs. Moreover, as will be appreciated, different electric motor assemblies may have different characteristics and may require differing configurations for various operating parameters. For example, configuration parameters requiring different values may include a frictional constant, an inertia constant, a damping coefficient, gear ratios, a torque constant, a voltage constant, and so forth. Preset values for such configuration parameters, as well as others, may be stored in the memory circuitry 74 for each of a plurality of electric motor assemblies.

By way of example, a user may mechanically couple the electric motor assembly 54 to the wire drive 48 and electrically couple the electric motor assembly 54 to the drive circuitry 66. Subsequently, the user may select the electric motor assembly 54 from a menu of a plurality of electric motor assemblies displayed on the user interface of the control panel 26 of the welding wire feeder 14. The control panel 26 may communicate the selection of the electric motor assembly 54 to the interface circuitry 76, which may communicate the selection to the processor 72. The processor 72 may then retrieve the particular configuration parameters for the electric motor assembly 54 stored in the memory circuitry 74. Thereafter, the processor may send the configuration parameters to the control circuitry 70 in order that the control circuitry 70 may apply appropriate control signals to the drive circuitry 66 for the operation of the electric motor assembly 54.

Alternatively, after the user couples the electric motor assembly 54 to the wire drive 48 and the drive circuitry 66, the user interface of the control panel 26 may provide one or more customizable parameter settings (a frictional constant, an inertia constant, a damping coefficient, gear ratios, a torque constant, a voltage constant, and so forth) different from the preset values for the configuration parameters. That is, a user may be able to manual enter a desired value for one or more configuration parameters for the electric motor assembly 54. Subsequently, the user-customized configuration parameter may be communicated to the interface circuitry 76, the processor 72, and the control circuitry 70. Thereafter, the control circuitry 70 may apply appropriate control signals to the drive circuitry 66 for the operation of the electric motor assembly 54.

In another embodiment, the welding wire feeder 14 may be configured to automatically recognize the electric motor assembly 54 when the electric motor assembly 54 is coupled to the wire feeder 14. For example, the welding wire feeder 14 may include a radio frequency (RF) sensor, and the electric motor assembly 54 may include a RF tag. In such an embodiment, the RF sensor of the welding wire feeder 14 may detect the RF tag of the electric motor assembly 54 when the electric motor assembly 54 is coupled to the wire feeder 14. Thereafter, the RF sensor may communicate the presence of the electric motor assembly 54 to the processor 72, which may retrieve the configuration parameters for the electric motor assembly 54 from the memory circuitry 74 and send the configuration parameters to the control circuitry 70. In other embodiments of the welding wire feeder 14 configured to automatically recognize a particular electric motor assembly, the wire feeder 14 may be configured to identify an electric motor assembly by measuring the armature resistance of the electric motor assembly once it is coupled to the welding wire feeder 14. Furthermore, the electric motor assembly 54 may have a memory device integrated into its speed sensor, or the electric motor assembly chassis itself. The integrated memory device could be queried by the control circuitry 70 to provide motor parameters and/or calibration information.

Additionally, in some configurations, the interface circuitry 76 may be coupled to the welding power supply 12. In such configurations, the welding power supply 12 may be allowed to exchange signals with the welding wire feeder 14. For example, multi-pin interfaces may be provided on the welding power supply 12 and the welding wire feeder 14, and a multi-conductor cable may be run between the power supply 12 and the wire feeder 14 to allow for such information as wire feed speeds, processes, selected currents, voltages, power levels or configuration parameters, and so forth to be set on either the power supply 12, the wire feeder 14, or both. Furthermore, the welding power supply 12 may provide feedback pertaining to the welding operation to the user through the control panel 26 of the welding wire feeder 14.

Figure 3:
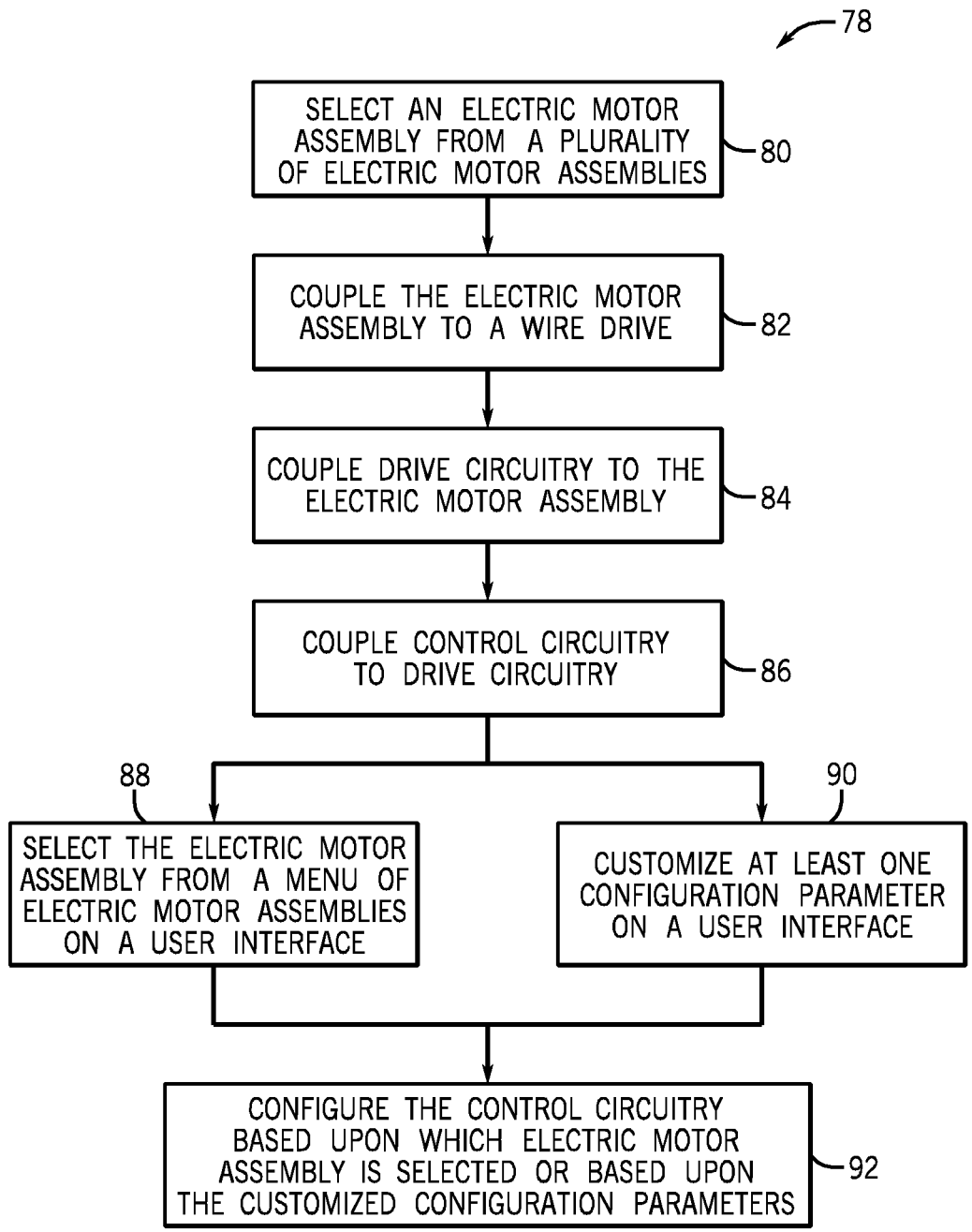
FIG. 3 is a flow chart illustrating an exemplary method of configuring a welding wire feeder system in accordance with aspects of the present invention.

FIG. 3 is a flow chart illustrating an exemplary method 78 for configuring the welding wire feeder 14 of FIGS. 1 and 2. As previously described, a user may select an electric motor assembly 54 from a plurality of electric motor assemblies to meet the wire feeding needs of a particular welding application, as provided by block 80. Thereafter, the user may mechanically couple the electric motor assembly 54 to the wire drive 48 of the welding wire feeder 14, as provided by block 82. Additionally, the user may electrically couple the drive circuitry 66 of the welding wire feeder 14 to the electric motor assembly 54, as provided by block 84. Furthermore, control circuitry 70 may be coupled to the drive circuitry 66, as represented by block 86. After the electric motor assembly 54 is properly coupled to the welding wire feeder 14, the user may select the electric motor assembly 54 from a menu of electric motor assemblies on a user interface, as provided by block 88. In some embodiments, the user interface may be a part of the control panel 26 of the welding wire feeder 14. Alternatively, the user may customize at least one configuration parameter on the user interface, as provided by block 90. That is, the user may manually enter a desired setting for one or more configuration parameters. Thereafter, the control circuitry 70 may be configured based upon which electric motor assembly 54 is selected by the user on the user interface or based upon the one or more customized configuration parameters entered by the user on the user interface, as provided by block 92. In particular, the user interface may communicate the configuration parameters to the control circuitry 70 through a processor 72, memory circuitry 74, and interface circuitry 76. In this way, various electric motor assemblies may be used with a single welding wire feeder 14 without the need for upgrading or replacing the control circuitry 70 and software of the welding wire feeder 14. Similarly, the welding wire feeder 14 may be field configurable by a user.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire feeder system comprising:
   a wire drive configured to contact a welding wire and to drive the welding wire towards a welding application;
   an electric motor assembly coupled to the wire drive and configured to force rotation of the wire drive during operation, the electric motor assembly being selected from a plurality of electric motor assemblies useable on the wire feeder;
   drive circuitry coupled to the electric motor assembly and configured to apply drive signals to the electric motor assembly in operation; and
   control circuitry coupled to the drive circuitry and configured to apply control signals to the drive circuitry based upon which electric motor assembly is selected, wherein the control circuitry is field configurable to drive each of the plurality of electric motor assemblies based upon configuration parameters stored in the control circuitry, wherein the electric motor assembly comprises an electric motor and a gear reducer, and wherein at least one of the configuration parameters comprises a speed conversion based upon the gear reducer.

2. The system of claim 1, wherein the control circuitry comprises a processor and memory circuitry, the memory circuitry storing configuration parameters for each of the plurality of electric motor assemblies.

3. The system of claim 1, wherein the electric motor assembly comprises a DC motor.

4. The system of claim 1, wherein the control circuitry provides pulse width modulated signals to the drive circuitry to regulate a duty cycle of drive signals from the drive circuitry to the electric motor assembly.

5. The system of claim 1, comprising a user interface coupled to the control circuitry and configured to allow for user selection of an electric motor assembly from the plurality of electric motor assemblies.

6. The system of claim 5, wherein the user interface provides a selection list of preset electric motor assemblies.

7. The system of claim 5, wherein the user interface provides at least one user-customizable parameter setting different from preset electric motor assembly settings.

8. A welding wire feeder system comprising:
   a wire drive configured to contact a welding wire and to drive the welding wire towards a welding application;
   a plurality of electric motor assemblies, each electric motor assembly configured to be coupled to the wire drive and to force rotation of the wire drive during operation;
   drive circuitry configured to be coupled to any one of the electric motor assemblies and configured to apply drive signals to a selected one of the electric motor assemblies in operation;
   control circuitry coupled to the drive circuitry and configured to apply control signals to the drive circuitry based upon which electric motor assembly is selected; and
   a user interface coupled to the control circuitry and configured to allow for user selection of an electric motor assembly from the plurality of electric motor assemblies,
   wherein the control circuitry is field configurable to drive each of the plurality of electric motor assemblies based upon configuration parameters stored in the control circuitry.

9. The system of claim 8, wherein the configuration parameters comprise a frictional constant, an inertia constant, a damping coefficient, a gear ratio, a drive roll size, a torque constant, a voltage constant, a motor resistance, a number of poles, or a motor type.

10. The system of claim 8, wherein the user interface provides a selection list of preset electric motor assemblies.

11. The system of claim 8, wherein the user interface provides at least one user-customizable parameter setting different from preset electric motor assembly settings.

12. The system of claim 8, wherein at least one electric motor assembly of the plurality of electric motor assemblies comprises an electric motor and a speed sensor.

13. The system of claim 8, wherein the control circuitry comprises a processor and memory circuitry, the memory circuitry storing configuration parameters for each of the plurality of electric motor assemblies.

14. A method for configuring a welding wire feeder system comprising:
   coupling an electric motor assembly to a wire drive configured to contact a welding wire and to drive the welding wire towards a welding application, the electric motor assembly being selected from a plurality of electric motor assemblies;
   coupling drive circuitry to the electric motor assembly, the drive circuitry being configured to apply drive signals to a selected one of the electric motor assemblies in operation;
   coupling control circuitry to the drive circuitry, the control circuitry being configured to apply control signals to the drive circuitry during operation;
   configuring the control circuitry based upon which electric motor assembly is selected, wherein the control circuitry is field configurable to drive each of the plurality of electric motor assemblies based upon configuration parameters stored in the control circuitry; and
   displaying the plurality of electric motor assemblies on a user interface coupled to the control circuitry, the user interface configured to allow for a selection of an electric motor assembly from a menu of the plurality of electric motor assemblies and to communicate the selected electric motor assembly to the control circuitry.

15. The method of claim 14, comprising displaying the configuration parameters on the user interface coupled to the control circuitry, the user interface configured to allow for user customization of at least one of the configuration parameters.

16. The method of claim 14, wherein the control circuitry comprises a processor and memory circuitry, the memory circuitry storing configuration parameters for each of the plurality of electric motor assemblies.

17. The method of claim 14, wherein the electric motor assembly comprises a DC motor, a brushless DC motor, a salient pole brushless DC motor, or an AC induction motor.

* * * * *